(12) United States Patent
Mack et al.

(10) Patent No.: US 10,164,296 B2
(45) Date of Patent: Dec. 25, 2018

(54) BATTERY MODULE SEPARATOR PLATES

(71) Applicant: Johnson Controls Technology Company, Holland, MI (US)

(72) Inventors: Robert J. Mack, Milwaukee, WI (US); Richard M. DeKeuster, Racine, WI (US); Jennifer L. Czarnecki, Franklin, WI (US); Jason D. Fuhr, Sussex, WI (US); Mark R. Johnson, Milwaukee, WI (US); Jonathan P. Lobert, Hartford, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 285 days.

(21) Appl. No.: 14/656,500

(22) Filed: Mar. 12, 2015

(65) Prior Publication Data

US 2016/0268643 A1    Sep. 15, 2016

(51) Int. Cl.
*H01M 10/42*    (2006.01)
*H01M 2/14*    (2006.01)
(Continued)

(52) U.S. Cl.
CPC ........ *H01M 10/4207* (2013.01); *H01M 2/14* (2013.01); *H01M 2/30* (2013.01); *H01M 6/42* (2013.01); *H01M 10/052* (2013.01); *H01M 10/613* (2015.04); *H01M 10/625* (2015.04); *H01M 10/647* (2015.04); *H01M 10/653* (2015.04); *H01M 10/6557* (2015.04); *H01M 2220/20* (2013.01)

(58) Field of Classification Search
CPC .......... H01M 10/4207; H01M 10/613; H01M 10/6557; H01M 2/14; H01M 2/202; H01M 2/30; H01M 10/647
See application file for complete search history.

(56) References Cited

U.S. PATENT DOCUMENTS

| 712,178 A | 10/1902 | Chamberlain |
| 7,326,491 B2 | 2/2008 | Takahasi et al. |
(Continued)

FOREIGN PATENT DOCUMENTS

WO    2012125115 A1    9/2012

OTHER PUBLICATIONS

PCT/US2016/017583 International Search Report and Written Opinion dated May 4, 2016.
(Continued)

*Primary Examiner* — Jonathan G Jelsma
(74) *Attorney, Agent, or Firm* — Fletcher Yoder P.C.

(57) ABSTRACT

The present disclosure includes a battery module having a first electrochemical cell and a second electrochemical cell positioned adjacent to the first electrochemical cell. The battery module also includes a separator plate disposed between the first electrochemical cell and the second electrochemical cell. The separator plate includes a body comprising a first side and a second side opposite the first side. The first side is disposed adjacent a first face of the first electrochemical cell and includes a first indention. The first indention defines a first space between the first face of the first electrochemical cell and the first side of the separator plate. The first space is configured to enable swelling of the first electrochemical cell into the first space.

17 Claims, 7 Drawing Sheets

(51) Int. Cl.
*H01M 6/42* (2006.01)
*H01M 10/613* (2014.01)
*H01M 10/625* (2014.01)
*H01M 10/647* (2014.01)
*H01M 10/653* (2014.01)
*H01M 10/6557* (2014.01)
*H01M 2/30* (2006.01)
*H01M 10/052* (2010.01)

(56) References Cited

U.S. PATENT DOCUMENTS

| | | | |
|---|---|---|---|
| 8,163,420 | B2 | 4/2012 | Okada et al. |
| 8,673,480 | B2 | 3/2014 | Barter et al. |
| 8,999,536 | B2 | 4/2015 | Kwag et al. |
| 9,142,809 | B2 | 9/2015 | Kim |
| 2006/0115720 | A1 | 6/2006 | Kim |
| 2009/0111010 | A1 | 4/2009 | Okada et al. |
| 2010/0167115 | A1* | 7/2010 | Okada ............... H01M 2/1077 429/99 |
| 2011/0092111 | A1* | 4/2011 | Tsuchiya ............ H01M 2/202 439/765 |
| 2011/0135985 | A1* | 6/2011 | Kim ..................... H01M 10/02 429/120 |
| 2012/0003526 | A1* | 1/2012 | Kume ................. H01M 2/0262 429/151 |
| 2013/0252045 | A1* | 9/2013 | Park .................... H01M 2/1016 429/82 |
| 2013/0252063 | A1 | 9/2013 | Park |
| 2013/0260197 | A1 | 10/2013 | Okada et al. |
| 2014/0014420 | A1* | 1/2014 | Nakamura .......... H01M 2/1077 180/65.1 |
| 2014/0038012 | A1* | 2/2014 | Alimario ............ H01M 10/656 429/72 |
| 2016/0197321 | A1* | 7/2016 | Tyler ................... H01M 2/305 429/89 |
| 2016/0218339 | A1* | 7/2016 | Nishimori ......... H01M 10/6555 |

OTHER PUBLICATIONS

Oh Ki-Yong et al., "Rate Dependence of Swelling in Lithium-Ion Cells", Journal of Power Sources, vol. 267, pp. 197-202, May 20, 2014.

* cited by examiner

BATTERY MODULE SEPARATOR PLATES

BACKGROUND

The present disclosure relates generally to the field of batteries and battery modules. More specifically, the present disclosure relates to features (e.g., separator plates) configured to separate and/or facilitate positioning of electrochemical cells in a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include arrangements of electrochemical cells within a housing or casing of the battery module. In traditional configurations, the electrochemical cells may be susceptible to electrical shorts. Further, the electrochemical cells may thermally expand, which may negatively affect the electrochemical cells, the housing or casing of the battery module, and/or other components of the battery module. Further still, positioning of the electrochemical cells within the housing or casing of the battery module may be inaccurate and/or inefficient. Accordingly, it is now recognized that improved separation and/or positioning of electrochemical cells within battery modules is needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having a first electrochemical cell and a second electrochemical cell positioned adjacent to the first electrochemical cell. The battery module also includes a separator plate disposed between the first electrochemical cell and the second electrochemical cell. The separator plate includes a body comprising a first side and a second side opposite the first side. The first side is disposed adjacent a first face of the first electrochemical cell and includes a first indention. The first indention defines a first space between the first face of the first electrochemical cell and the first side of the separator plate. The first space is configured to enable swelling of the first electrochemical cell into the first space.

The present disclosure also relates to a separator plate configured to be disposed between a first electrochemical cell and a second electrochemical cell, where the separator plate includes a first recess into a first side of the separator plate. The first recess is configured to enable swelling of the first electrochemical cell into the first recess. The separator plate also includes a second recess into a second side of the separator plate opposite to the first side. The second recess is configured to enable swelling of the second electrochemical cell into the second recess. The separator plate also includes a first tab extending from an edge of the separator plate in alignment with the first and second sides. The separator plate also includes a second tab extending from the edge of the separator plate. The first tab is configured to extend between a first terminal of the first electrochemical cell and a second terminal of the second electrochemical cell, and the second tab is configured to extend between a third terminal of the first electrochemical cell and a fourth terminal of the second electrochemical cell.

The present disclosure also relates to a battery module stack. The battery module stack includes a first prismatic electrochemical cell having a first broad side, a second prismatic electrochemical cell having a second broad side, and a separator disposed between the first prismatic electrochemical cell and the second prismatic electrochemical cell. The separator includes a first face disposed adjacent to the first broad side of the first prismatic electrochemical cell, a second face disposed adjacent to the second broad side of the second prismatic electrochemical cell, a first rectangular recess disposed in the first face and configured to enable swelling of the first broad side of the first prismatic electrochemical cell into the first rectangular recess, and a second rectangular recess disposed in the second face and configured to enable swelling of the second broad side of the second prismatic electrochemical cell into the second rectangular recess.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the electrochemical cells may be positioned (e.g., stacked) within a housing of the battery module. The electrochemical cells may be separated from each other by separator plates disposed between adjacent electrochemical cells. The separator plates may include tabs or other features configured to block electrical shorts. The separator plates may also include features configured to facilitate alignment of the electrochemical cells in a stack. Further, the separator plates may include channels or other features configured to enable a flow of cooling fluid (e.g., air) proximate to the electrochemical cells for cooling the electrochemical cells. Further still, the separator plates may include indentions (e.g., windows) positioned adjacent faces of the electrochemical cells. The indentions may provide space adjacent to the faces of the electrochemical cells to enable the electrochemical cells to swell into the space. A depth of each indention may be determined, depending on the embodiment, to enable a specific amount of swelling. Additionally or alternatively, the depth of each indention may be determined, depending on the embodiment, to increase a life span of the electrochemical cells. These and other features of the separator plates will be described in detail below with reference to the figures.

Figure 1:
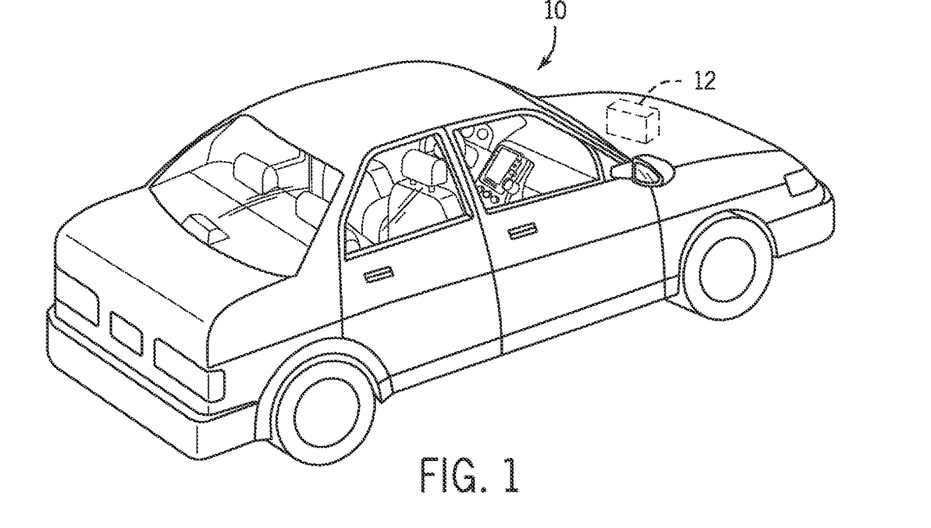
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
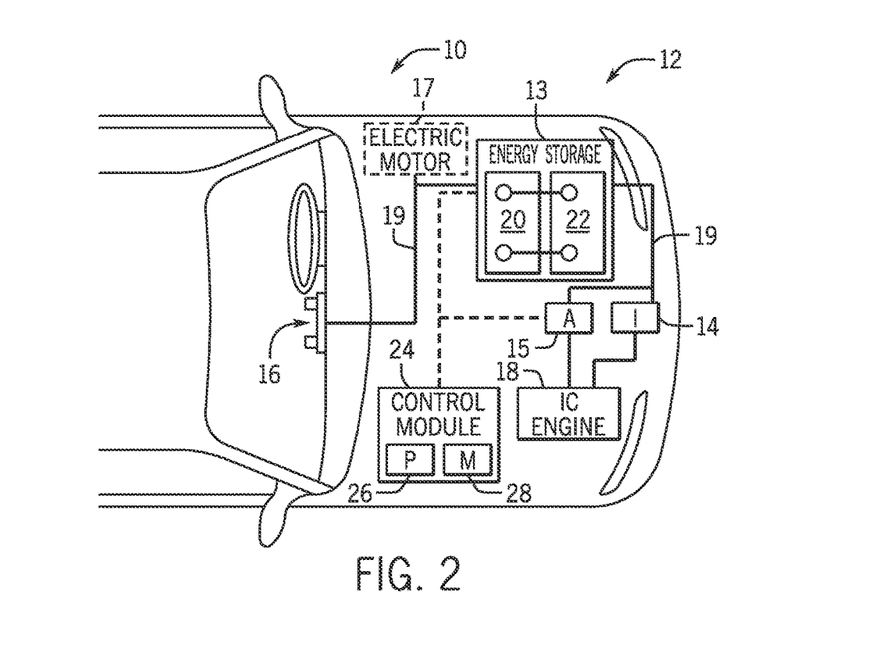
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
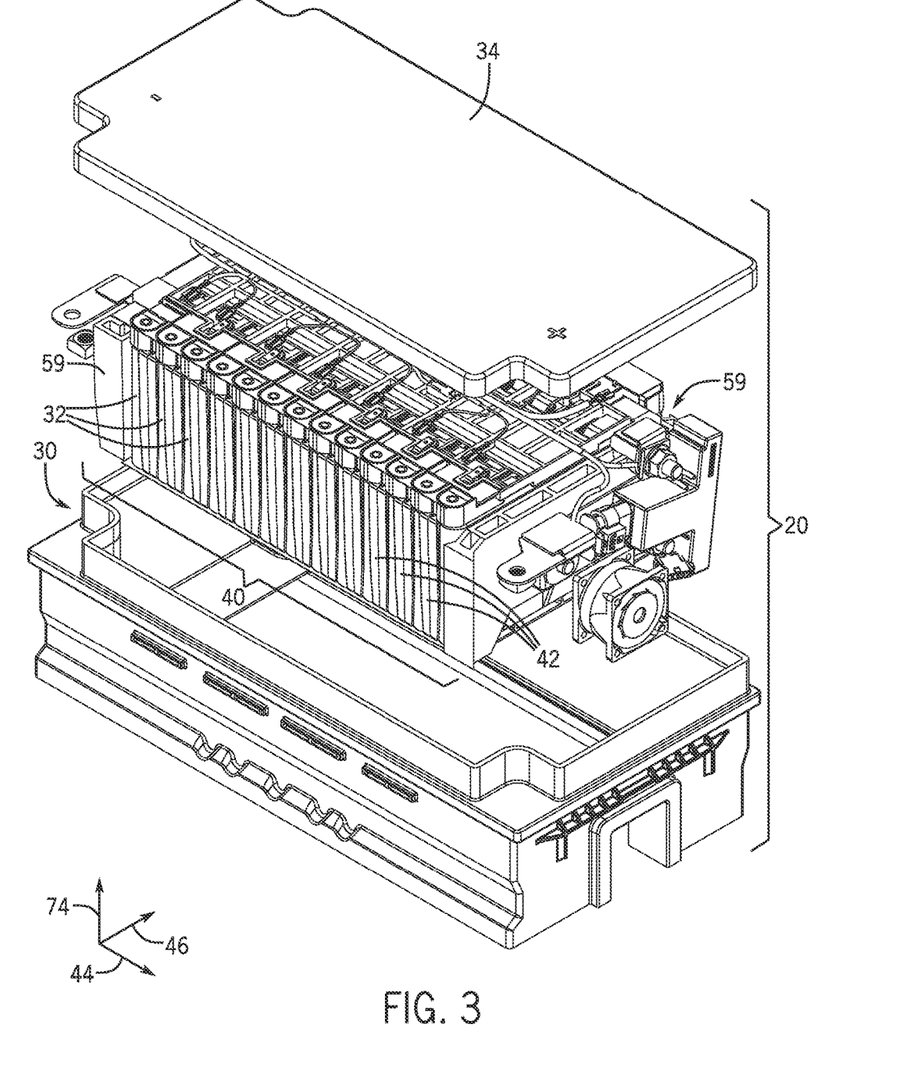
FIG. 3 is a partially exploded perspective view of an embodiment of a battery module for use in the vehicle of FIG. 1, in accordance with an aspect of the present disclosure.

A partially exploded perspective view of an embodiment of the lithium-ion (Li-ion) battery module 20 of FIG. 2 is shown in FIG. 3. In the illustrated embodiment, the battery module 20 includes a housing 30 (e.g., plastic housing) configured to retain electrochemical cells 32 (e.g., prismatic lithium-ion (Li-ion) electrochemical cells) within the housing 30. The battery module 20 also includes a cover 30 configured to be disposed over the electrochemical cells 32 and seal against the housing 30. Depending on the embodiment, the cover 34 may be integral with the housing 30, or the cover 34 may be a separate component from the housing 30 and configured to couple to the housing 30. For example, the cover 34 may couple to the housing 30 via fasteners, adhesive, welding, brazing, or some other coupling mechanism.

As shown in the illustrated embodiment, the electrochemical cells 32 are disposed in a stack 40. It should be noted, however, that the battery module 20 may include any number of stacks 40, where the stacks 40 may be disposed side by side, one on top of the other, or both. In accordance with the present disclosure, adjacent electrochemical cells 32 are separated from each other via a respective separator plate 42 also included in the stack 40, where the separator plate 42 electrically isolates portions of the electrochemical cells 32 from each other. For example, the electrochemical cells 32 may include metal casings, and the separator plates 42 may include an electrically insulative material to electrically isolate the metal casings from each other. Indeed, in the illustrated embodiment, the electrochemical cells 32 and the separator plates 42 are stacked in an alternating order in one stack 40 extending in direction 44, where the separator plates 42 extend between adjacent electrochemical cells 32 in a direction 46 perpendicular to the direction 44 in which the stack 40 extends. Thus, the separator plates 42 block contact between any of the casings of the adjacent electrochemical cells 32.

The stack 40 of alternating electrochemical cells 32 and separator plates 42, in some embodiments, may be arranged prior to inserting the stack 40 into the housing 30 and sealing the housing 30 via the cover 34 disposed over the stack 40.

For example, the stack 40 may be assembled and then inserted as one unit into the housing 30. In other embodiments, the electrochemical cells 32 and the separator plates 42 may be indexed individually into the housing 30 until the stack 40 is fully assembled. For example, indexing may be facilitated by moving the housing laterally (e.g., in direction 44) as the electrochemical cells 32 and the separator plates 42 are inserted (e.g., indexed) into the housing 30, such that a position of the indexing tool remains constant as the housing 30 moves to facilitate reception of the next electrochemical cell 32 and/or separator plate 42. Alternatively, indexing may be facilitated by maintaining a constant position of the housing 30 and moving an indexing position of each successive electrochemical cell 32 and/or separator plate 42 (e.g., by moving the indexing tool). It should be noted that indexing may include individual (e.g., separate) indexing of each electrochemical cell 32 and separator plate 42, indexing of pairs of one electrochemical cell 32 and one separator plate 42, or indexing of sandwiches of one separator plate 42 between two electrochemical cells 32 or one electrochemical cell 32 between two separator plates 42. Indeed, in accordance with the present disclosure, any suitable grouping of electrochemical cells 32 and separator plates 42 may be included while indexing to arrange (e.g., assemble) the stack 40.

After the stack 40 of electrochemical cells 32 and separator plates 42 is assembled, the electrochemical cells 32 may be electrically connected to form an aggregate network of electrically connected electrochemical cells 32. Alternatively, the electrochemical cells 32 may be electrically connected while the stack 40 is arranged or assembled. For example, pairs of electrochemical cells 32 may be electrically connected as they are inserted into the housing 30. In either arrangement, the separator plates 42 may be utilized to facilitate electrical coupling between terminals of adjacent electrochemical cells 32 that are intended to be electrically coupled while blocking electrical shorts between terminals of adjacent electrochemical cells 32 that are not intended to be electrically coupled.

Figure 4:
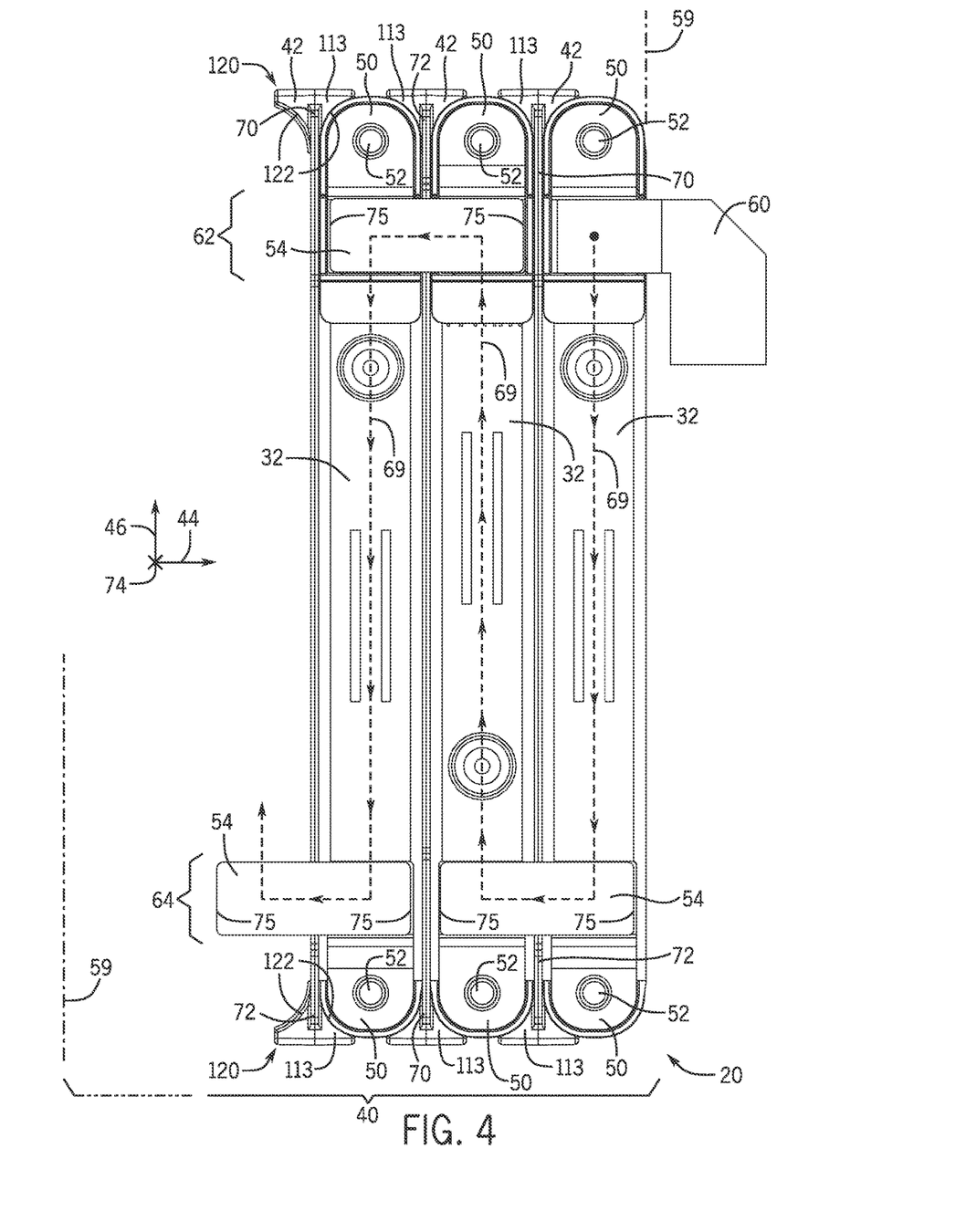
FIG. 4 is a top view of a portion of the battery module of FIG. 3, in accordance with an aspect of the present disclosure.

A top view of a portion of the battery module 20 of FIG. 3 is shown in FIG. 4. Specifically, a portion of the stack 40 of electrochemical cells 32 and separator plates 42 is shown. In the illustrated embodiment, three electrochemical cells 32 and three separator plates 42 are shown. As previously described, the electrochemical cells 32 are electrically connected (e.g., in series, in parallel, or in a combination thereof). For example, adapters 50 are disposed over terminals 52 of each electrochemical cell 32. The adapters 50 may include metal or some other electrically conductive material to provide an electrical connection between the terminal 52 and the corresponding adapter 50. To electrically couple adjacent adapters 50 (and, thus, adjacent terminals 52 of adjacent electrochemical cells 32), electrically conductive (e.g., metal) bus bars 54 are configured to contact, and span between, adjacent adapters 50. Accordingly, an electrical path is established from a first terminal 52 of a first electrochemical cell 32 to an adjacent second terminal 52 of an adjacent second electrochemical cell 32 (e.g., via a first adapter 50 disposed over the first terminal 52, the bus bar 54, and a second adapter 50 disposed over the second terminal 52).

However, it should be noted that, in some embodiments, other assemblies and/or components may be utilized for electrically connecting adjacent terminals 52 of adjacent electrochemical cells 32. For example, in another embodiment, the bus bars 54 may directly contact or interface with the terminals 52. Further, it should be noted that the two electrochemical cells 32 disposed on either end 59 of the stack 40 may include a major bus bar 60 extending from one of the terminals 52 of the electrochemical cell 32 away from the stack 40 (e.g., in direction 44). The major bus bar 60, for example, may be configured to couple to a major terminal of the battery module 20, where the major terminal is configured to be coupled to a load.

It should also be noted that, in the illustrated embodiment, the bus bars 54 on a first side 62 of the stack 40 and the bus bars 54 on a second side 64 of the stack 40 are staggered by one terminal/adapter 52, 50 pair each, with respect to the other side 64, 62. In other words, the electrochemical cells 32 each include two terminal/adapter 52, 50 pairs, one on each side 62, 64 of the stack 40, where one of the terminal/adapter 52, 50 pairs (e.g., on side 62) includes a bus bar 54 extending in a first direction (e.g., direction 44), and the other of the terminal/adapter 52, 50 pairs (e.g., on side 64) includes a bus bar 54 extending in a second direction (e.g., opposite to direction 44) opposite of the first direction (e.g., direction 44). This enables coupling of all the electrochemical cells 32 in the stack 40 via an electrical path that forms a zig-zag electrical path 69 through all the electrochemical cells 32 of the stack 40.

In accordance with the present disclosure, the illustrated stack 40 includes the electrochemical cells 32 in addition to the separator plates 42. As previously described, adjacent electrochemical cells 32 are separated from each other via the separator plates 42. Each of the separator plates 42 includes a large tab 70 extending upwardly in direction 74 in addition to a small tab 72 extending upwardly in direction 74. The large tab 70 is configured to block electrical contact between adjacent terminals 52 and adapters 50 that are not configured to be electrically coupled (e.g., on either side 75 of each bus bar 54). The small tab 72 is configured to enable electrical communication between adjacent terminals 52 and adapters 50 that are configured to be electrically coupled, while blocking electrical contact between portions of the adjacent, electrically coupled terminals 52 and adapters 50 that are not intended to touch. In other words, the small tabs 72 are configured to enable positioning of the bus bars 54 across adjacent adapter/terminal 50, 52 pairs while blocking contact between the adjacent adapter/terminal 50, 52 pairs. Further, in the illustrated embodiment, an orientation of the separator plates 42 alternates for each successive separator plate 42 in direction 44. In other words, the first separator plate 42 includes the large tab 70 on side 62 of the stack 40 and the small tab 72 on side 64 of the stack 40. The separator plates 42 immediately adjacent to, and on either side of, the first separator plate 42, thus, include the corresponding small tab 72 on side 62 of the stack 40 and the corresponding large tab 70 on side 64 of the stack 40. The alternating orientation of the separator plates 42 facilitates the zig-zag electrical path 69 extending through all of the electrochemical cells 32 in the stack 40, as previously described, by enabling the aforementioned staggered positions of the bus bars 54.

Figure 5:
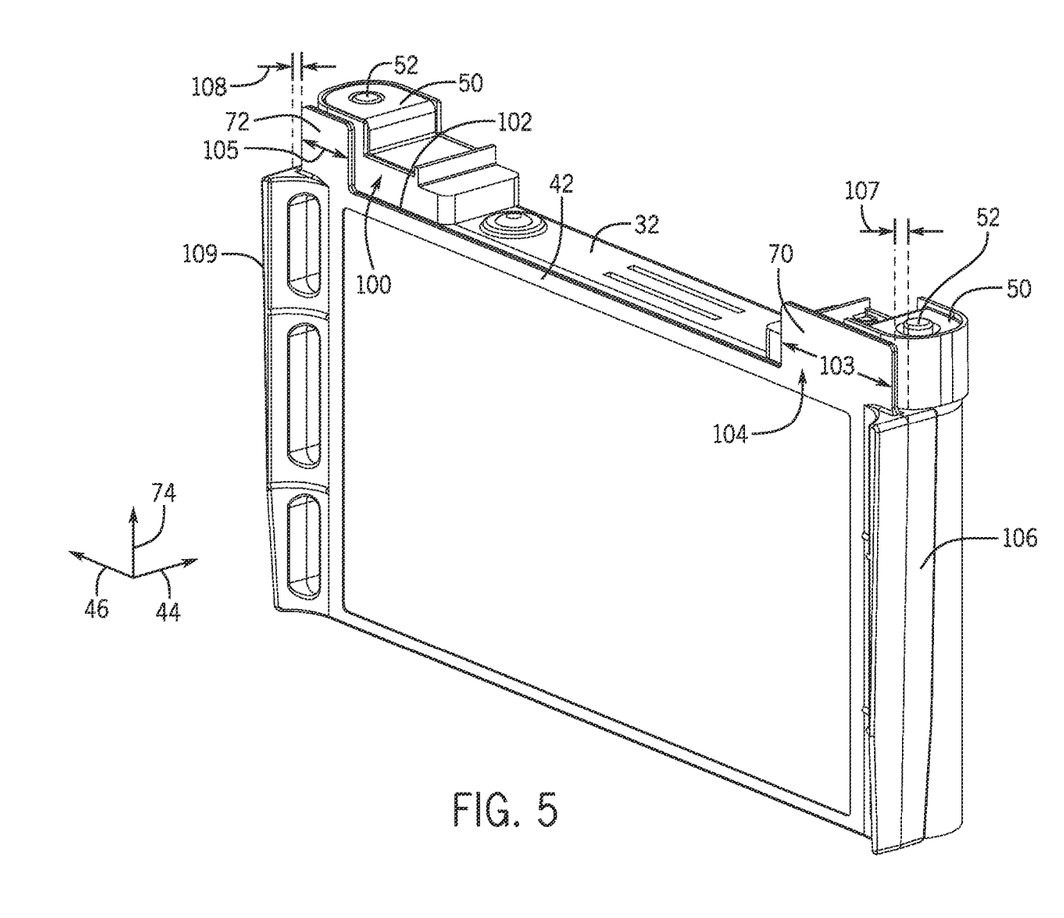
FIG. 5 is a perspective view of an embodiment of a separator plate and an electrochemical cell for use in the battery module of FIG. 3, in accordance with an aspect of the present disclosure.

A perspective view of one of the electrochemical cells 32 and one of the separator plates 42 of the stack 40 of FIG. 4 is shown in FIG. 5. In the illustrated embodiment, the separator plate 42 includes the large tab 70 extending in direction 74 proximate to one of the adapter/terminal 50, 52 pairs of the electrochemical cell 32, and the small tab 72 extending in direction 74 proximate to the other of the adapter/terminal 50, 52 pairs of the electrochemical cell 32. Both the large tab 70 and the small tab 72 extend from an edge 102 (e.g., top or side) of the separator plate 42. As previously described, the small tab 72 enables positioning of the bus bar 54 (not shown) in a space (indicated by arrow 100) across adjacent adapters 50 and over the edge 102 of the separator plate 42. The corresponding space (indicated by arrow 104) proximate the large tab 70 is blocked by the large tab 70. For example, the small tab 72 extends along the edge 102 a first distance 105 and the large tab 72 extends along the edge a second distance 103 greater than the first distance 105. Thus, the first distance 105 of the small tab 72 enables the space 100 for positioning the bus bar 54 (not shown), while the second distance 103 of the large tab 70 blocks the space 104 to block positioning of the bus bar 54 (and to electrically isolate bus bars 54 on either side of the large tab 72). It should be noted that the edge 102 extends uniformly in direction 46 except for the small and large tabs 72, 70 extending from the edge 102, as shown. Further, it should be noted that the large tab 70 may be offset from an outer edge 106 of the separator plate 42 by a first distance 107, and the small tab 72 may be offset from an opposing outer edge 109 of the separator plate 42 by a second distance 108. In the illustrated embodiment, the first distance 107 is substantially equal to the second distance 108 (e.g., accounting for engineering tolerances). In another embodiment, however, the first distance 107 may be greater than or less than the second distance 108. The first and second distances 107, 108 may be altered depending on components proximate to the outer edges 106, 108 of the separator plate 42 and whether electrical isolation of the components proximate to the outer edges 106, 108 is appropriate.

Figure 6:
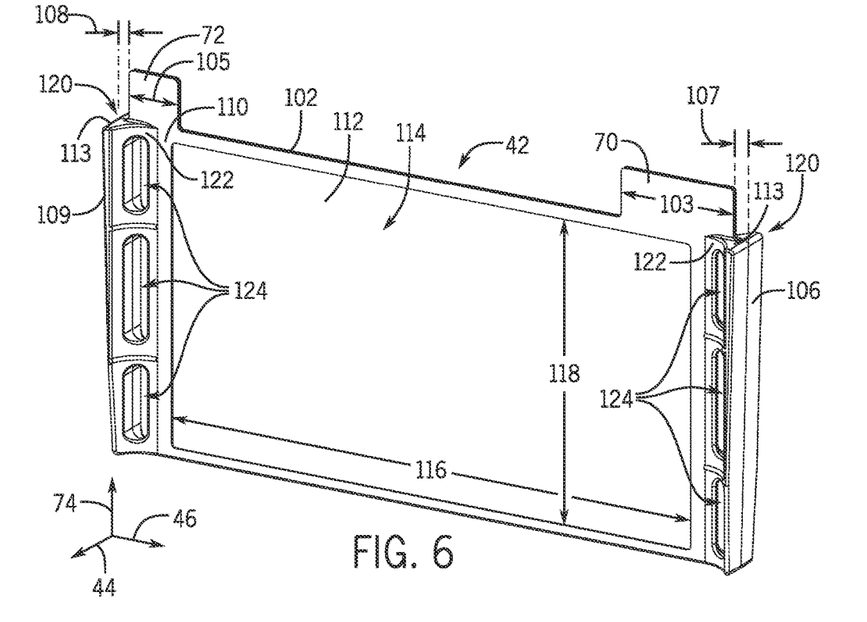
FIG. 6 is a perspective view of the separator plate of FIG. 5, in accordance with an aspect of the present disclosure.
Figure 7:
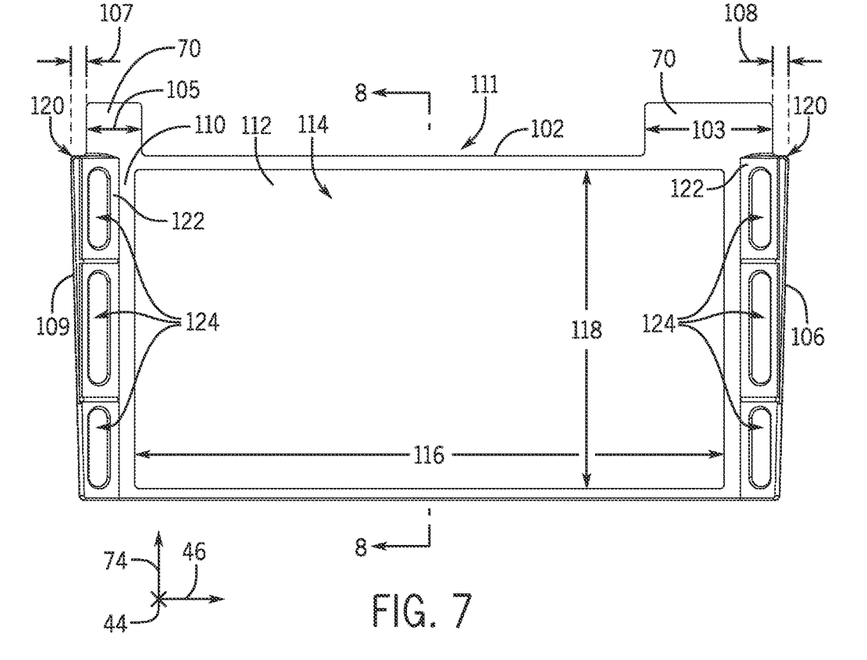
FIG. 7 is a front view of the separator plate of FIG. 5, in accordance with an aspect of the present disclosure.

Perspective and side views of only the separator plate 42 (e.g., without the electrochemical cell 32) of FIG. 5 are shown in FIGS. 6 and 7, respectively. In the illustrated embodiments, the separator plate 42 includes faces 110 (e.g., large faces, broad faces, sides, broad sides) on either side of the separator plate 42 and extending in direction 46. The separator plate 42 also includes the top 102 or edge extending between the two broad faces 110. The broad faces 110 are configured to be disposed immediately adjacent faces (e.g., broad faces or sides) of the electrochemical cells 32 on either side of the separator plate 42. The broad faces 110 include indentions 112 (e.g., recesses, thinned portions, indents, impressions) into the broad faces 110. The indentions 112 define spaces 114 that are configured to be positioned between the electrochemical cells 32 and the broad faces 110 of the separator plate 42. The indentions 112 enable the electrochemical cells 32 on either side of the separator plate 42 to swell or thermally expand into the spaces 114 defined by the indentions 112. Additionally or alternatively, the spaces 114 defined by the indentions 112 may be configured to receive thermal pads, where each thermal pad extract heat from the adjacent electrochemical cell 32 and transfers the heat, for example, to the separator plate 42. In general, dimensions of the indentions 112 may be determined depending on operating conditions and expectations of the electrochemical cells 32 and/or the battery module 20 (not shown) in which the electrochemical cells 32 are disposed (e.g., the battery module 20 in FIG. 3). For example, a depth (e.g., in direction 44) of the indention 112 (and, thus, a depth of the corresponding space 114) may be determined based on an amount of thermal expansion desired to be enabled for each electrochemical cell 32. Additionally, the depth of the indention 112 may be determined based on a desired lifespan of each electrochemical cell 32 (or corresponding battery module 20). Further, a length 116 (e.g., in direction 46) and/or height 118 (e.g., in direction 74) of the indention 112 may be determined based on dimensions of the electrochemical cells 32 or expected thermal expansion locations of the electrochemical cells 32.

In addition to the indentions 112 on the broad faces 110 of the separator plate 42, other features may be included to accommodate the electrochemical cells 32 generally disposed on either side of the separator plate 42 (e.g., adjacent to the broad faces 110). For example, the separator plate 42 may include end pieces 120 on either end or side of a body 111 of the separator plate 42 (e.g., where the body 11 includes the broad faces 110). The end pieces 120 may include curved portions 122 (e.g., curved faces) that accommodate curvature of the electrochemical cells 32 (e.g., as shown in FIG. 5). For example, the adjacent curved portions 122 of each end piece 120 may include opposing concave curves that each curve away from the corresponding opposite side (e.g., broad face 110) of the separator plate 42 to form a curved triangular cross-section 113, as shown in FIG. 6 (and, e.g., FIG. 4). Further, the end pieces 120 may be integral with the body 111 of the separator plate 42, or the end pieces 120 may be separate pieces coupled to the body 111 of the separator plate 42 via, for example, fasteners, adhesive, welding, or some other coupling mechanism, method, or technique. Further still, as shown in the embodiments in FIGS. 6 and 7, the end pieces 120 may include slots 124 extending through the end pieces 120, for example, in direction 44. The slots 124 may reduce a total material of the separator plate 42 and, thus, a material cost of the separator plate 42. Further, the slots 124 may enable flow of a cooling fluid therethrough. These and other features (e.g., cooling features) of the separator plate 42 will be described in detail below.

Figure 8:
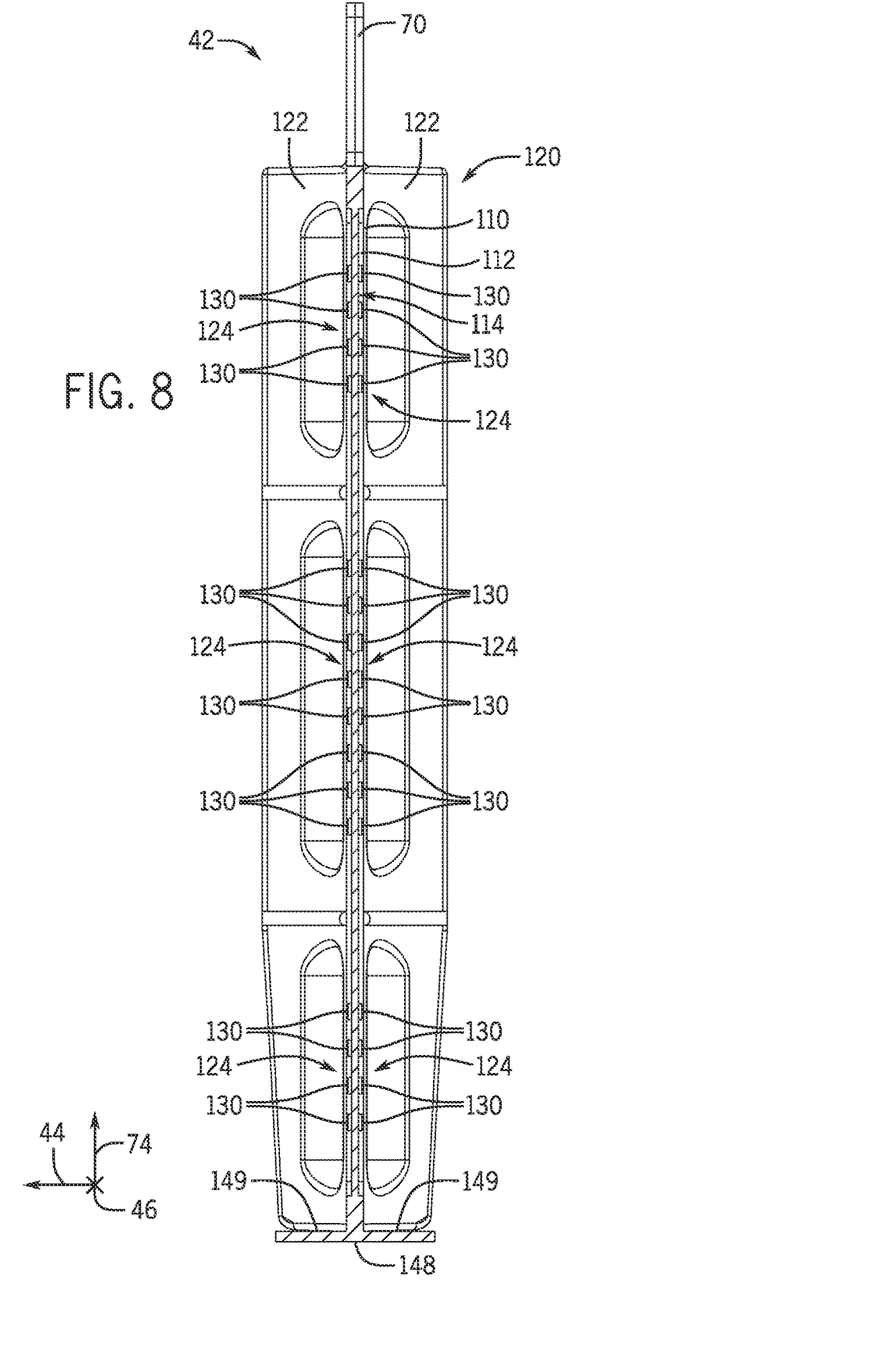
FIG. 8 is a cross-sectional side view of the separator plate of FIG. 7 taken along line 8-8, in accordance with an aspect of the present disclosure.

For example, a cross-sectional side view of the separator plate 42 of FIG. 7, taken along line 8-8 in FIG. 7, is shown in FIG. 8. In the illustrated embodiment, the separator plate 42 includes the slots 124 extending through the separator plate 42 in direction 44 through the end piece 120. As previously described, the slots 124 may reduce an amount of material of the separator plate 42, enable flow of a cooling fluid therethrough, or both. Additionally, cooling channels 130 may extend (e.g., in direction 46) from the slots 124 through a portion of each broad face 110 of the separator plate 42. For example, the cooling channels 130 may provide fluid communication between the slots 124 of the illustrated end piece 120 and the spaces 114 defined by the indentions 112 on each broad face 110 of the separator plate 42. The cooling channels 130 may be disposed through portions of both broad faces 110 of the separator plate 42 and from both end pieces 120 of the separator plate 42. Accordingly, a cooling fluid (e.g., air) may flow from the first end piece 120 through a set of the cooling channels 130, into the spaces 114 on either broad face 110 of the separator plate 42, and through a set of the cooling channels 130 toward the other of the two end pieces 120. The cooling channels 130 generally enable cooling of the electrochemical cells 32 which, as previously described, include faces disposed immediately adjacent the spaces 114 defined by the indentions 112 in the broad faces 110 of the separator plate 42. Thus, the cooling fluid may flow through the spaces 114 and immediately adjacent to the electrochemical cells 32. It should be noted that, depending on the embodiment, any number of cooling channels 130 (including none) may be included on one separator plate 42. Further, the cooling channels 130 may include circular cross-sections, triangular cross-sections, rectangular cross-sections, or any other suitably shaped cross-sections to permit fluid flow therethrough. Further still, the cooling fluid provided to the cooling channels 130 may be provided by an active cooling system of the battery module 20, or the cooling channels 130 may receive ambient air.

In addition to the cooling features described above, the separator plate 42 may also include features configured to interface with one or more of the electrochemical cells 32 to retain the electrochemical cell(s) 32. For example, in the illustrated embodiment, the separator plate 42 includes a foot 148 that is configured to extend underneath the electrochemical cells 32. For example, the foot 148 extends outward from the broad faces 110 along direction 44 and includes a top surface 149 that may contact the electrochemical cells 32 proximate to the broad faces 110 of the separator plate 42. The foot 148 may extend along an entire length of the separator plate 42 in direction 46, or the foot 148 may extend along a partial length of the separator plate 42 in direction 46. Further, the separator plate 42 may include one foot 148, or the separator plate 42 may include multiple feet 148. For example, in one embodiment, the separator plate 42 may include two feet 148, where each foot 148 is disposed proximate to and/or underneath a corresponding one of the end pieces 120 of the separator plate 42. In general, the feet or foot 148 of the separator plate 42 may retain the electrochemical cells 32 on either side of the separator plate 42 and enable movement of the separator plate 42 and electrochemical cells 32 together as one unit. Further, it should be noted that the separator plate 42 may include ribbed or textured surfaces along any portion of the separator plate 42 (e.g., the broad faces 110, the indentions 112, the end pieces 120, the curved faces 122 of the end pieces 120, the top surfaces 149 of the feet or foot 148) configured to contact the electrochemical cell(s) 32. The ribbed or textured surfaces may facilitate an enhanced grip by the separator plate 42 on the electrochemical cell(s) 32. Further, the ribbed or textured surfaces may facilitate a method of manufacturing the stack 40 of electrochemical cells 32 and separator plates 42, as set forth below.

Figure 9:
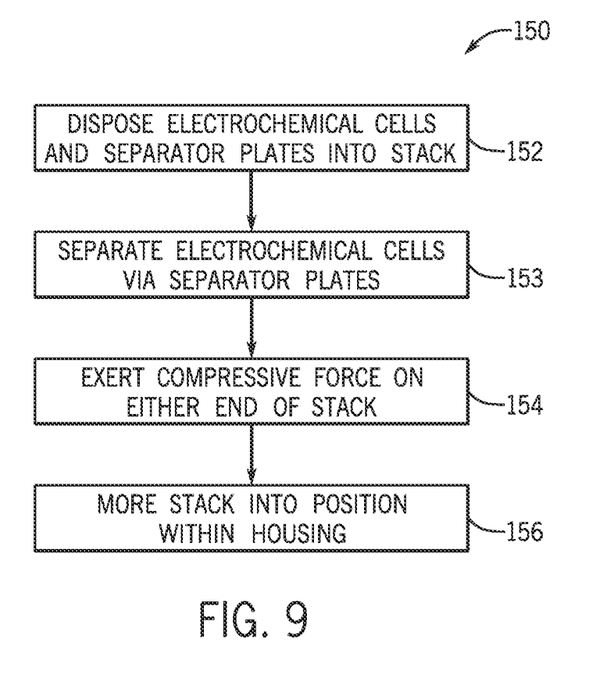
FIG. 9 is a process flow diagram of an embodiment of a method of assembling the battery module of FIG. 3, in accordance with an aspect of the present disclosure.

A process flow diagram of an embodiment of a method 150 of manufacturing the battery module 20 having the electrochemical cells 32 and the separator plates 42 is shown in FIG. 9. In the illustrated embodiment, the method 150 includes disposing the electrochemical cells 32 and the separator plates 42 into the stack 40 (block 152) and separating adjacent electrochemical cells 32 from each other via respective separator plates 42 (block 153). For example, the electrochemical cells 32 and the separator plates 42 are disposed in an alternating order, such that the separator plates 42 electrically isolate portions (e.g., housings) of the electrochemical cells 32 from each other. In general, the stack 40 may include two or more electrochemical cells 32.

The method 150 also includes exerting a compressive force on either end of the stack 40 (block 154). For example, after arranging the stack 40, the stack 40 may need to be moved to facilitate other steps of the manufacturing process. Accordingly, a compressive force is exerted on either side of the stack 40 and into the stack 40. The compressive force may be exerted, for example, by a clamping mechanism. The stack 40 may then be lifted (e.g., by the clamping mechanism) and moved from one place to another. As previously described, the separator plates 42 may have feet 148, ribs, or textured features to facilitate additional retention of the electrochemical cells 32 as the stack 40 is moved.

Further, the method includes moving the stack 40 into position within the housing 30 of the battery module 20 (block 156). For example, the clamping mechanism may exert the compressive force (see block 154) on either end of the stack 40, move the stack 40, and position the stack 40 within the housing 30 of the battery module 20. The clamping mechanism may then release the compressive force after the stack 40 is in position.

One or more of the disclosed embodiments, alone or in combination, may provide one or more technical effects useful in the manufacture of battery modules, and portions of battery modules. In general, embodiments of the present disclosure include a battery module having a stack of alternating electrochemical cells and separator plates disposed in a housing of the battery module. The separator plates are configured to electrically isolate portions of the electrochemical cells from each other. Further, the separator plates are configured to enable swelling of the electrochemical cells into spaces defined by indentions (e.g., recesses) in the separator plates. In general, enabling swelling of the electrochemical cells into the spaces defined by the indentions may reduce a compressive force against the electrochemical cells. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
a first electrochemical cell and a second electrochemical cell positioned adjacent to the first electrochemical cell;
a separator plate disposed between the first electrochemical cell and the second electrochemical cell; and
a body of the separator plate comprising a first side and a second side opposite the first side;
wherein the first electrochemical cell comprises a first terminal and a second terminal, the second electrochemical cell comprises a third terminal and a fourth terminal, the first terminal of the first electrochemical cell is positioned adjacent to the third terminal of the second electrochemical cell, the second terminal of the first electrochemical cell is positioned adjacent to the fourth terminal of the second electrochemical cell, the separator plate comprises a large tab extending between the first and third terminals, the large tab includes a first length extending along a length of the separator plate, the separator plate comprises a small tab extending between the second and fourth terminals, the small tab includes a second length extending along the length of the separator plate, and the second length is less than the first length;
wherein the second length of the small tab of the separator plate permits an electrical coupling between the second and fourth terminals, and wherein the first length of the large tab of the separator plate blocks an additional electrical coupling between the first and third terminals; and wherein the large tab comprises a first upper edge disposed no higher than top surfaces of the first terminal and the third terminal, and wherein the small tab comprises a second upper edge disposed no higher than top surfaces of the second terminal and the fourth terminal.

2. The battery module of claim 1, wherein the electrochemical cells are prismatic, lithium-ion (Li-ion) electrochemical cells.

3. The battery module of claim 1, wherein the separator plate comprises curved end pieces on either end of the body of the separator plate, and wherein the curved end pieces conform to a first curvature of the first electrochemical cell and a second curvature of the second electrochemical cell.

4. The battery module of claim 3, wherein the curved end pieces comprise opposing concave surfaces.

5. The battery module of claim 3, wherein the curved end pieces comprise slots that extend through the separator plate.

6. The battery module of claim 1, wherein the separator plate comprises a first material configured to electrically isolate a first housing of the first electrochemical cell from a second housing of the second electrochemical cell.

7. The battery module of claim 1, wherein the separator plate comprises at least a first foot configured to extend under, and to contact, at least a first bottom surface of at least the first electrochemical cell.

8. The battery module of claim 1, wherein the separator plate comprises ribs configured to increase a grip between the separator plate and the first and second electrochemical cells.

9. The battery module of claim 1, wherein the small tab comprises a first height, wherein the large tab comprises a second height, and wherein the first height and the second height are substantially equal.

10. The battery module of claim 1, wherein the small tab and large tab are offset from a first outer edge and a second outer edge of the separator plate, respectively.

11. The battery module of claim 1, wherein the large tab overlaps with at least a first portion of the first terminal and the third terminal along the length of the separator plate, and wherein the small tab overlaps with at least a second portion of the second terminal and the fourth terminal along the length of the separator plate.

12. A battery module comprising a separator plate disposed between a first electrochemical cell of the battery module and a second electrochemical cell of the battery module, wherein the separator plate comprises:

a first tab disposed along an upper edge of the separator plate, wherein the first tab is spaced from a first outer edge of the separator plate by a first distance; and a second tab disposed along the upper edge of the separator plate, wherein the second tab is spaced from a second outer edge of the separator plate opposing the first outer edge of the separator plate by a second distance, wherein the first distance is equal to the second distance, wherein the first tab extends along the upper edge a third distance, wherein the second tab extends along the upper edge a fourth distance, wherein the third distance is greater than the fourth distance, wherein the third distance of the first tab is configured to block an electrical coupling between a first terminal of the first electrochemical cell and a second terminal of the second electrochemical cell, wherein the fourth distance of the second tab is configured to permit an additional electrical coupling between a third terminal of the first electrochemical cell and a fourth terminal of the second electrochemical cell, wherein the first tab comprises a first upper tab edge disposed no higher than top surfaces of the first terminal and the second terminal, and wherein the second tab comprises a second upper tab edge disposed no higher than top surfaces of the third terminal and the fourth terminal.

13. The battery module of claim 12, wherein the separator plate comprises a body having a first thickness and a foot having a second width that exceeds the first thickness of the body.

14. A battery module stack, comprising:

a first prismatic electrochemical cell comprising a first broad side;

a second prismatic electrochemical cell comprising a second broad side; and a separator disposed between the first prismatic electrochemical cell and the second prismatic electrochemical cell, wherein the separator comprises a first face disposed adjacent to the first broad side of the first prismatic electrochemical cell, a second face disposed adjacent to the second broad side of the second prismatic electrochemical cell, an edge extending between the first face and the second face of the separator, a first tab protruding from the edge, and a second tab protruding from the edge, wherein the first tab extends along the edge a first distance such that the first tab blocks an electrical coupling between a first terminal of the first electrochemical cell and a second terminal of the second electrochemical cell, wherein the first tab extends upwardly to a first height that is no higher than top surfaces of the first terminal and the second terminal, and wherein the second extends along the edge a second distance, wherein the second distance is less than the first distance such that the second tab permits an additional electrical coupling between a third terminal of the first electrochemical cell and a fourth terminal of the second electrochemical cell, and wherein the second tab extends upwardly to a second height that is no higher than top surfaces of the third terminal and the fourth terminal.

15. The battery module stack of claim 14, wherein the first tab is disposed a first distance from a first outer edge of the separator, the second tab is disposed a second distance from a second outer edge of the separator, and the first distance is substantially equal to the second distance.

16. The battery module of claim 9, wherein the first height is continuous along the first length, and wherein the second height is continuous along the second length.

17. The battery module of claim 9, wherein the first height of the large tab and the second height of the small tab are substantially equal to a terminal height of the first, second, third, and fourth terminals.

* * * * *

UNITED STATES PATENT AND TRADEMARK OFFICE
CERTIFICATE OF CORRECTION

PATENT NO. : 10,164,296 B2
APPLICATION NO. : 14/656500
DATED : December 25, 2018
INVENTOR(S) : Robert J. Mack et al.

Page 1 of 1

It is certified that error appears in the above-identified patent and that said Letters Patent is hereby corrected as shown below:

In the Drawings

In FIG. 9, Sheet 7 of 7, for Step "156", in Line 1, please delete "MORE" and insert -- MOVE --.

In the Specification

In Column 3, Line 17, please delete "DRAWINGS" and insert -- BRIEF DESCRIPTION OF THE DRAWINGS --.

In Column 6, Line 34, please delete "cover 30" and insert -- cover 34 --.

In Column 9, Line 26, please delete "outer edges 106, 108" and insert -- outer edges 106, 109 --.

In Column 9, Line 28, please delete "outer edges 106, 108" and insert -- outer edges 106, 109 --.

In the Claims

In Column 14, Line 40, in Claim 14, please delete "second extends" and insert -- second tab extends --.

Signed and Sealed this
Nineteenth Day of March, 2019

Andrei Iancu
*Director of the United States Patent and Trademark Office*